US008484368B2

(12) United States Patent
Robert et al.

(10) Patent No.: US 8,484,368 B2
(45) Date of Patent: Jul. 9, 2013

(54) METHOD AND SYSTEM FOR OPTIMIZING DOWNLOAD AND INSTANTANEOUS VIEWING OF MEDIA FILES

(75) Inventors: Arnaud Robert, Burbank, CA (US); Mark Arana, West Hills, CA (US); Eddie Drake, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 824 days.

(21) Appl. No.: 12/573,093

(22) Filed: Oct. 2, 2009

(65) Prior Publication Data

US 2011/0082914 A1 Apr. 7, 2011

(51) Int. Cl.
*G06F 15/16* (2006.01)

(52) U.S. Cl.
USPC .......................................................... 709/231

(58) Field of Classification Search
USPC ................................................. 709/231, 246
See application file for complete search history.

(56) References Cited

U.S. PATENT DOCUMENTS

| | | | | | |
|---|---|---|---|---|---|
| 5,122,873 | A | * | 6/1992 | Golin | 375/240.23 |
| 6,139,197 | A | * | 10/2000 | Banks | 709/217 |
| 6,496,980 | B1 | * | 12/2002 | Tillman et al. | 725/90 |
| 7,463,775 | B1 | * | 12/2008 | Sites | 382/232 |
| 2003/0204519 | A1 | * | 10/2003 | Sirivara et al. | 707/101 |
| 2005/0165911 | A1 | * | 7/2005 | Homiller | 709/219 |
| 2005/0262257 | A1 | * | 11/2005 | Major et al. | 709/231 |
| 2008/0109865 | A1 | * | 5/2008 | Su et al. | 725/116 |
| 2008/0162713 | A1 | * | 7/2008 | Bowra et al. | 709/231 |
| 2009/0043906 | A1 | * | 2/2009 | Hurst et al. | 709/231 |
| 2010/0050221 | A1 | * | 2/2010 | McCutchen et al. | 725/109 |
| 2012/0102184 | A1 | * | 4/2012 | Candelore | 709/224 |
| 2012/0110628 | A1 | * | 5/2012 | Candelore | 725/110 |

* cited by examiner

*Primary Examiner* — Douglas Blair
(74) *Attorney, Agent, or Firm* — Ference & Associates LLC (57) ABSTRACT

Methods and arrangements for replacing segments or portions of a media file that was received via adaptive streaming or other transfer mechanism, to obtain a media file for local storage and further playback as if it came from a download. This maximizes the experience of both instant viewing and delayed viewing, and additionally provides a capability to extend the viewing experience to in-home streaming and copying to other devices. Accordingly, there is provided herein a capability to take advantage of adaptive streaming to provide a highly reliable mechanism for consumers to view media in real-time transmission, and also to obtain a resultant, locally stored media file of high quality. There is further provided herein a capability to obtain complete copies of media at different quality levels. Moreover, embodiments of the present invention facilitate adaptive streaming and copying within the home environment.

34 Claims, 4 Drawing Sheets

METHOD AND SYSTEM FOR OPTIMIZING DOWNLOAD AND INSTANTANEOUS VIEWING OF MEDIA FILES

BACKGROUND

Internet-delivered media takes two primary forms today. Download, or progressive download (referred to hereinafter simply as "download"), is a method to deliver a media file for local storage and playback to a media application or device (i.e., a receiving device), while streaming is a method to deliver and view a media file in real-time without storing it on a local receiving device. Media may also be delivered via local copy from physical media such as a portable drive, an optical disc, or another arrangement.

In the download scenario, a media file is downloaded to the receiving device at the quality (e.g., resolution, bit rate, etc) of the originating file. While it is possible to view the media file as it is downloading, delivery conditions may affect playback performance. For example, changes in network bandwidth, transmission delays or packet loss will decrease the effective download rate, forcing the receiving device to pause on playback until enough media is available again in the playback buffer.

Streaming employs real-time communication protocols to provide an uninterrupted viewing experience. However, streaming delivery is also vulnerable to changes in network bandwidth, transmission delays, and packet loss that can negatively impact playback and incur buffering problems. Furthermore, streaming protocols are designed to not provide a local copy of a media file to a consumer for further local storage and playback.

"Adaptive streaming" has been recently introduced to overcome the shortcomings of Internet delivery. Adaptive streaming allows different quality levels (e.g. different bit rates, or resolutions) of the same media file to be sent to a receiving device during the streaming as conditions change over time, depending on a number of factors, including net measured bandwidth, transmission delay, and available CPU resources of the receiving device. Among two primary approaches to adaptive streaming, one makes available multiple versions of a streamable media file at different quality levels, with the receiving device "jumping" from one media source to another in response to specific criteria. In the second approach, a media file is first divided into short segments (e.g. 3 seconds of video) before being encoded at different quality levels, and the receiving device can then request a subsequent portion at an appropriate bit rate depending on a similar set of criteria. (Media file "segments", as broadly discussed and understood herein, could alternatively be termed "blocks" or "portions".) In both approaches, if the delivery conditions are good the receiving device will receive media at the highest available quality level while if delivery conditions degrade, the receiving device will receive media at a lower quality level. In a typical scenario, the receiving device will playback multiple quality levels of the same media file over a period of time, since the network and device CPU conditions (and any other criteria taken into account) will vary over the same time.

While adaptive streaming provides a manner for playing back media files more reliably in a variable delivery network such as the Internet, it is not currently employed for transmitting a file to a consumer for local storage and further playback. While a streamed media file could well be stored for that purpose, it would almost inevitably contain segments of mixed quality throughout, and this clearly would fall short of a likely consumer expectation of a consistently high quality media file when playing back a downloaded file from a device.

Accordingly, a need has been recognized in connection with combining the specific advantages of both streaming and download, in such a way that consumers have the best experience possible in all consumption scenarios, whether that be streaming or download.

BRIEF SUMMARY

Broadly contemplated, in accordance with at least one presently preferred embodiment of the present invention, are methods and arrangements for replacing segments or portions of a media file that was received via adaptive streaming, to obtain a media file for local storage and further playback as if it came from a download. This maximizes the experience of both instant viewing and delayed viewing, and additionally provides a capability to extend the viewing experience to in-home streaming and copying to other devices.

Accordingly, there is provided herein a capability to take advantage of adaptive streaming to provide a highly reliable mechanism for consumers to view media in real-time transmission, and also to obtain a resultant, locally stored media file of high quality. By using a background download process, media file segments can be examined in memory as a result of the adaptive streaming process and segments that are not of the desired quality can be selectively requested and replaced.

There is further provided herein a capability to obtain complete copies of media at different quality levels. Moreover, embodiments of the present invention facilitate adaptive streaming and copying within the home environment.

In summary, one aspect of the invention provides a system comprising: a media device having one or more processors and one or more modules executable by the one or more processors, the one or more modules being configured to: read an initial media file comprising file segments each having an audiovisual quality, the segments comprising a first segment having a first quality and at least a second segment having a second quality, the second quality being different from the first quality; and modify the read media file such that: the first segment retains the first quality; and the at least one second segment is modified to match the first quality.

Another aspect of the invention provides a system comprising: a media device arrangement comprising a first media device and a second media device; said first media device comprising one or more processors and one or more modules executable by the one or more processors, the one or more modules being configured to: read an initial media file comprising file segments each having an audiovisual quality, the segments comprising a first segment having a first quality and at least a second segment having a second quality, the second quality being different from the first quality; and copy to said second media device a media file comprising at least one file segment from said read media file corresponding to a single predetermined audiovisual quality.

A further aspect of the invention provides a method comprising: reading an initial media file comprising file segments each having an audiovisual quality, the segments comprising a first segment having a first quality and at least a second segment having a second quality, the second quality being different from the first quality; modifying the read media file such that: the first segment retains the first quality; and the at least one second segment is modified to match the first quality.

An additional aspect of the invention provides a method comprising: reading an initial media file comprising file segments each having an audiovisual quality, the segments comprising a first segment having a first quality and at least a second segment having a second quality, the second quality being different from the first quality; copying to a media device a media file comprising at least one file segment from the read media file corresponding to a single predetermined audiovisual quality.

Yet another aspect of the invention provides a computer program product comprising: a computer readable storage medium having computer readable program code embodied therewith, the computer readable program code comprising: computer program code configured to read a streaming media file comprising file segments each having an audiovisual quality, the segments comprising a first segment having a first quality and at least a second segment having a second quality, the second quality being different from the first quality; computer program code configured to modify the read media file such that: the first segment retains the first quality; and the at least one second segment is modified to match the first quality.

Still another aspect of the invention provides a computer program product comprising: a computer readable storage medium having computer readable program code embodied therewith, the computer readable program code comprising: computer program code configured to read an initial media file comprising file segments each having an audiovisual quality, the segments comprising a first segment having a first quality and at least a second segment having a second quality, the second quality being different from the first quality; computer program code configured to copy to a second media device a media file comprising at least one file segment from said read media file corresponding to a single predetermined audiovisual quality.

Furthermore, an additional aspect of the invention provides a system comprising: a media device having one or more processors and one or more modules executable by the one or more processors, the one or more modules being configured to: read an initial media file comprising file segments each having an audiovisual quality, the segments comprising a first segment having a first quality and at least a second segment having a second quality; and modify the read media file such that: the first segment is modified to match a third quality, the third quality being different from the first and second qualities; and the at least one second segment is modified to match the third quality.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings/figures. The following description is intended only by way of example and simply illustrates certain selected presently preferred embodiments of the invention as claimed herein.

Regarding the figures, the flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description now turns to the figures and select, presently preferred embodiments of the invention will be described. The following description of various embodiments of the invention is presented to highlight certain aspects of the invention, and the scope of the claimed embodiments of the invention will be pointed out in the appended claims.

Figure 1:
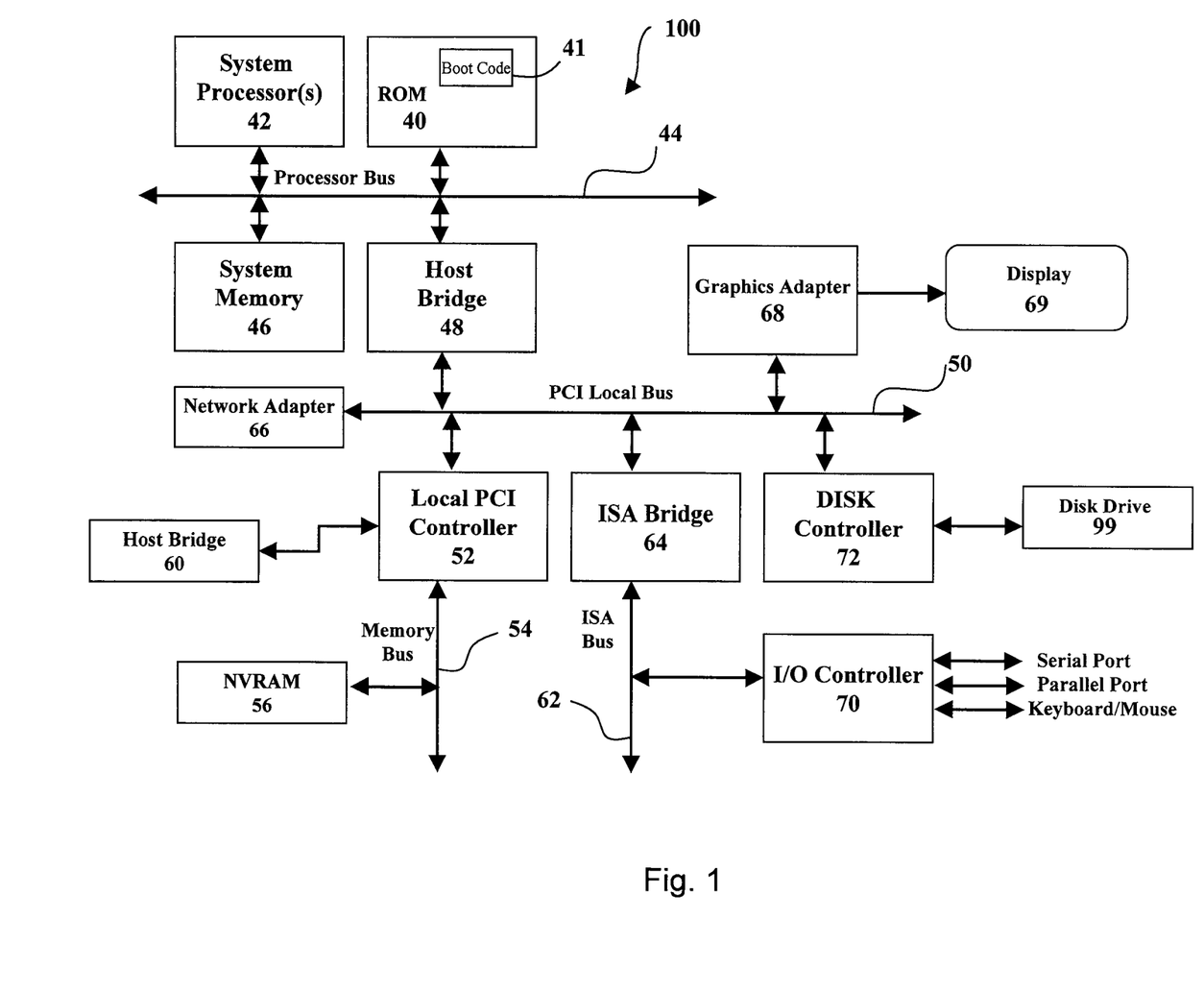
FIG. 1 illustrates a computer system.

Referring now to FIG. 1, there is depicted a block diagram of an illustrative embodiment of a computer system 100. The illustrative embodiment depicted in FIG. 1 may represent a device such as a game console, a set top box, a mobile device, a laptop, or a desktop or workstation computer. As is apparent from the description, however, embodiments of the invention may be implemented in any appropriately configured device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive 99 with PCI local bus 50. The USB Bus and USB Controller (not shown) are part of the Local PCI controller (52).

Figure 2:
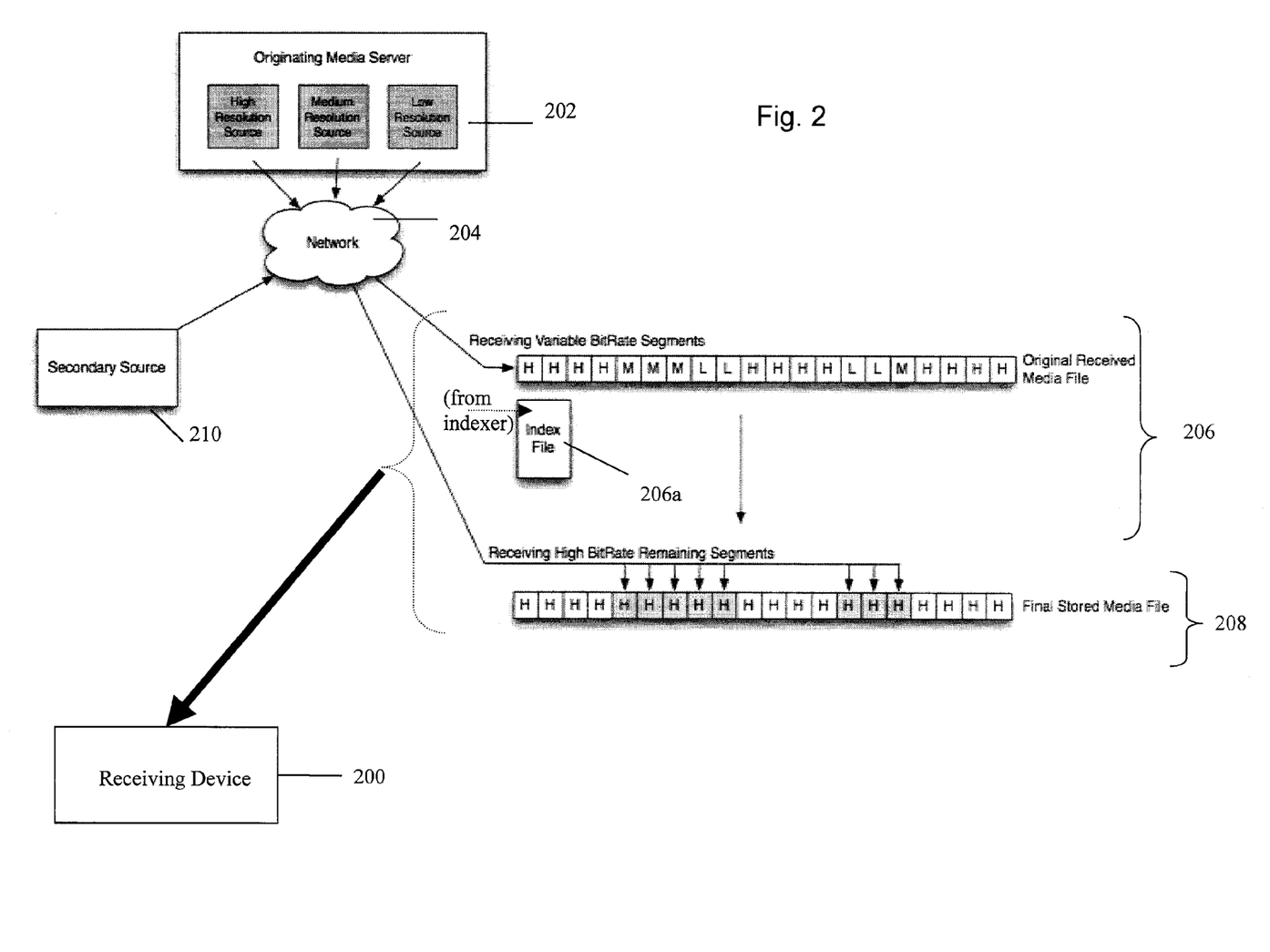
FIG. 2 schematically depicts an arrangement for providing media content to a receiving device.

As illustrated in FIG. 2, in accordance with at least one presently preferred embodiment of the present invention, an originating media server in the form of an adaptive streaming source 202 may preferably provide, via a network 204, a partial multi-resolution copy 206 of a media file to a receiving device 200. A media file may also be transferred via local copy to a receiving device 200, e.g., prior to the file being read. Receiving device 200 could be a media device that takes any of a very wide variety of conceivable forms, which may preferably include (but not be limited to) a mobile device, a gaming console, a set top box, a desktop or a laptop computer, including a computer system similar or analogous to that indicated at 100 in FIG. 1. Source 202 can preferably include individual sources for segments of high, medium and low resolution. As such, the partial copy 206 may be composed of high, medium and low resolution segments (H, M, L, respectively), as shown. (Of course, these three levels of resolution are provided herein merely by way of example. A greater number of levels of resolution is of course conceivable, such as levels of resolution intermediate to those commonly understood as "high", "medium" and "low".)

Once the streaming or transfer is completed, any segments not of high quality can be provided to the receiving device by a secondary source 210 to make stored media file 208. (This action may also be undertaken in parallel to the streaming [206] if available bandwidth would allow.) In this manner, while the instant streaming (206) can be adequate for real-time viewing if so desired by a user, the user may also now retain a copy of a higher-quality file on the device 200 for viewing at a later time. The secondary source 210 can conceivably take any of a very wide variety of forms, including (but not limited to) the originating source 202 itself, a singular source that is separate from the originating source 202, or a distributed source as could be the case with connected peer devices. The process of providing high quality segments to replace lower quality segments (transitioning from 206 to 208) can be brought about in any of a variety of ways. For instance, the receiving device 200 may request the "missing" high-quality segments, or the originating source 202 could proactively provide those segments and/or direct a different device (e.g., a separate secondary source 210) to send those segments.

It is conceivable to further employ an indexing mechanism (or indexer) as an arrangement to convey information about all of the segments being downloaded to other receiving devices. The indexer keeps a record of the information about any or all of the segments being downloaded, such as the duration, position and bit rate of the segments. The indexer may store the indexed information in memory or in an indexing file 206a or other suitable medium to convey information about the segments to other receiving devices. The indexer could be particularly useful if containing information at least about the "missing" segments, or the non-high resolution segments (in 206) that are to be replaced (at 208). Further, the indexed information (e.g., as can be provided in index file 206a) may be created by the originating source 202 or the receiving device 200. In the latter case, the indexed information may be employed by the receiving device 200 to request the missing segments from the originating source 202, or the indexed information may be sent to the originating source 202, which would then deliver the missing (high resolution) segments to the receiving device 200 (e.g., directly or via a third party).

Figure 3:
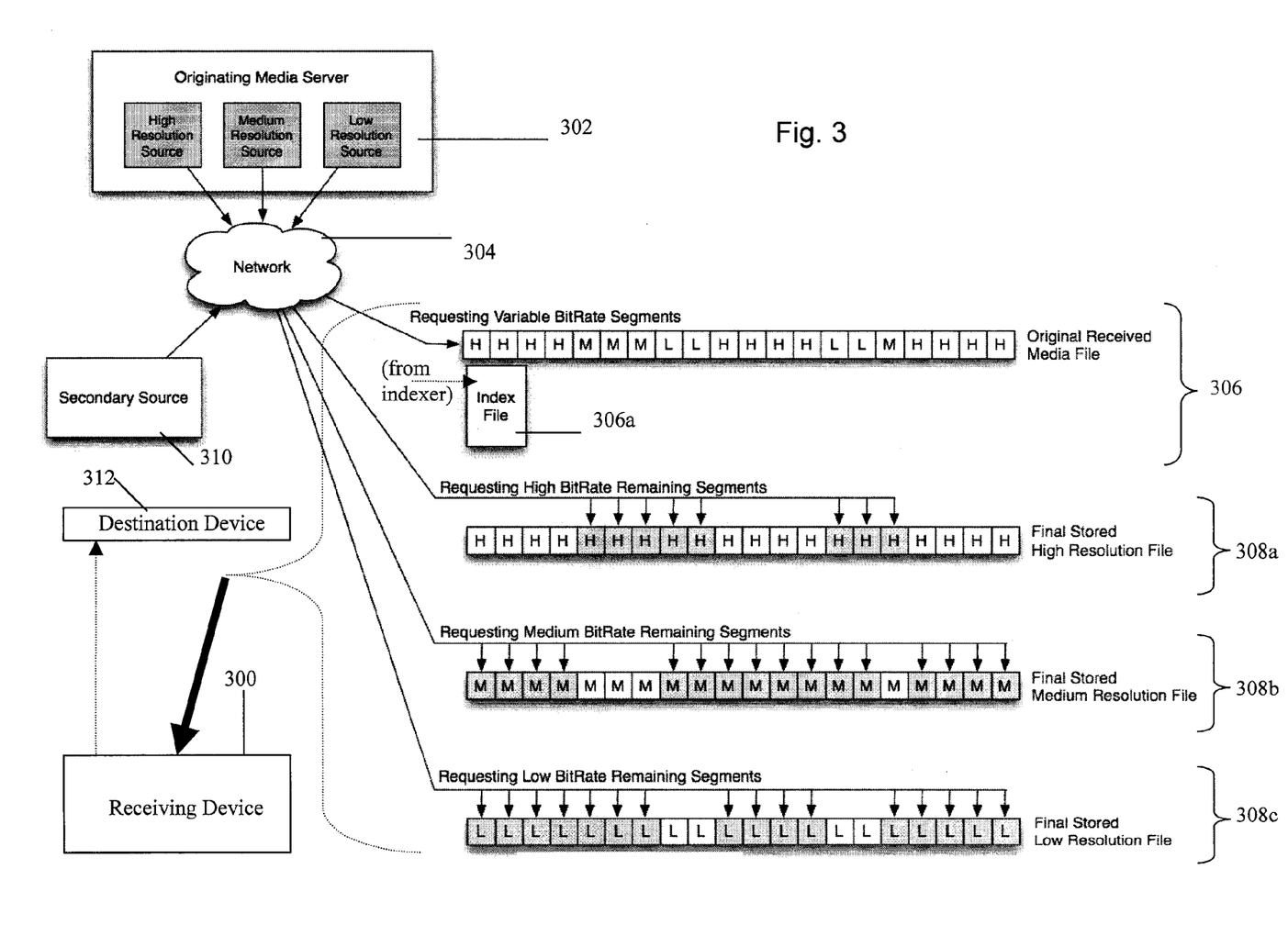
FIG. 3 schematically depicts a first variant arrangement for providing media content to a receiving device.

Alternatives to an index file could replicate a similar function. For instance, the media file itself (being downloaded) could have an identifier (explicit or derived) in each portion that declares or marks the resolution of that portion. This information could be requested or sent to a secondary source 210 or written to disk as an index file. However, an advantage to employing an index file 206a as discussed above is that in conveying information about portion types/resolutions, it is easily transportable, accessible and transferable A variant embodiment of the present invention is illustrated in FIG. 3, where reference numerals identifying similar components with respect to FIG. 2 are advanced by 100. Here, media content is preferably provided to receiving device 300 as one file but then modified and stored as three files 308a/b/c, corresponding to high, medium and low resolution files, respectively. (Again, the provision of three files and levels of resolution is shown here merely by way of illustrative and non-restrictive example, wherein additional streams of different, such as intermediate, resolution can certainly be provided.) Accordingly, the receiving device 300 ends up storing one copy of the media file for each of the three resolutions. Essentially, for each media file 308a/b/c, the process for restoring "missing" segments can be the same as described with respect to FIG. 2, except the process would now be carried out for each of the different levels of resolution.

By way of the embodiment of FIG. 3, the receiving device 300 can become something of a "base" source of adaptive streaming for in-home distribution to other devices, in the context of a home network which may have variable bandwidth, using the same adaptive streaming techniques described earlier. Such bandwidth variations may be due to the inherent network (e.g. a wireless network), other activity on the network, activity on the receiving device or the destination device or both, and so on). Similar principles could be applied here as discussed above with relation to FIG. 2, wherein the receiving device 300 may be thought of as an "originating source" [as at 202 in FIG. 2], albeit possibly limited by a lower processing power CPU, or other limitations, as compared to a typical originating source.

In a further refinement of the embodiment of FIG. 3, receiving device 300 could copy one of the media files 308a/b/c to a destination device 312 (as opposed to streaming the file) at a resolution which is most appropriate for the destination device. Thus, in as much as the receiving device 300 will have copies of the media file in different resolutions (e.g., H/M/L), second application of this particular variant wherein all segments of all resolutions are filled is one by which the receiving device copies the media file to the destination device 312 (instead of streaming it) at a resolution which is optimal for that destination device 312. As such, receiving device 300 could preferably retain information about capabilities of a destination device 312 (e.g., whether the latter is a portable player, PC, network attached storage [NAS], etc) and determine, as such, which media file 308a/b/c of which resolution would be appropriate for the destination device 312. Such a selection process could, e.g., be user-driven (i.e., the user would directly select which file he/she wants to transfer) or the process could be based on either an implicit deterministic process or an explicit choice based on pre-set device preference (explicit) settings.

Figure 4:
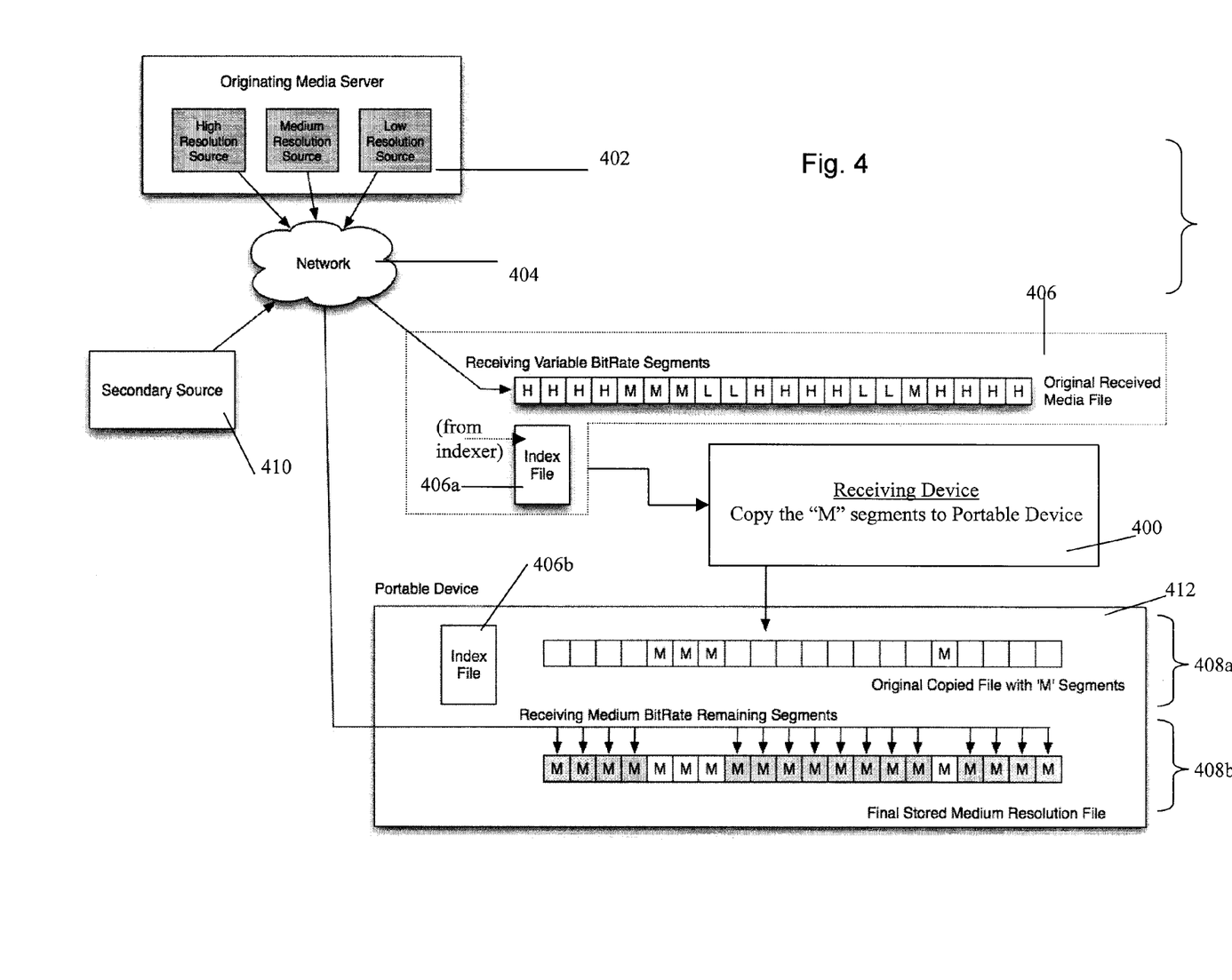
FIG. 4 schematically depicts a second variant arrangement for providing media content to a receiving device.

A second variant embodiment of the present invention is illustrated in FIG. 4, where reference numerals identifying similar components with respect to FIGS. 2 and 3 are advanced by a multiple of 100. In this case, the receiving device 400 receives media file segments of variable quality or bit rates (406) and copies the segments corresponding to one particular resolution (here, medium or "M") to another destination device (e.g., portable device) 412 in the form of a "partial" media file 408a. In other words, the copied media file 408a is "partial" in that it contains solely segments of one given resolution, but does not have all segments of the original media file 406 (and also may preferably contain a copied version 406b of the index file 406a). The destination device 412 may then preferably receive any and all "missing" media file segments (at the resolution associated with or desired for destination device 412) using a process such as that contemplated hereinabove for a receiving device 200/300 in either or both of FIGS. 2 and 3. The "portion filling" process can be undertaken whenever the "partial" media file 408a is copied over to destination device 412, or may be done with a delay or responsive to a predetermined condition. This thus allows for automated synchronization, real time synchronization and/or parallel synchronization of copies of the original media file 406. A very wide variety of processes for "portion filling" are conceivable. Such processes can act independently and can serve to control the analysis, requesting and filling in of necessary segments per resolution. Depending on settings, opportunity and other factors, download may or may not take place immediately, and the process indeed could vary from one download to another, or be governed by factors such as characteristics of the device CPU and network.

By way of another variant, which can be applied to the embodiments discussed hereinabove and/or conceivably to a very wide range of other embodiments, it is conceivable to download a media file of a given quality, e.g. of high quality, and then transform the same into a file of medium or low quality merely by degrading the high quality file, via essentially any suitable mechanism, to obtain the file of medium or low quality. This of course can also apply to mere segments of a downloaded high (or higher) quality file as opposed to a file in its entirety. Such actions would obviate the need to download an entire new media file which itself would contain the desired medium or low quality segments.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
a media device having one or more processors and instructions executable by the one or more processors, the instructions causing the processor to:
read a multi-resolution copy of an initial media file adaptively streamed and comprising file segments each having a resolution quality, the segments comprising a first segment having a first resolution quality and at least a second segment having a second resolution quality, the second resolution quality being different from the first resolution quality; and
employ resolution quality information of the file segments to:
obtain at least one replacement segment for the initial media file; and
modify the initial media file such that:
the first segment retains the first resolution quality; and
the at least one second segment is replaced to match the first resolution quality;
the system further being configured to store a modified version of the initial media file as a second media file comprising segments all having the first resolution quality.

2. The system according to claim 1, the instructions further causing the processor to modify the initial media file via changing the at least one second segment in the initial media file to match the first resolution quality.

3. The system according to claim 1, the instructions further causing the processor to obtain, from a first media source, at least one file segment having the first resolution quality and modify the initial media file with the at least one obtained file segment having the first resolution quality such that:
the first segment retains the first resolution quality; and
the at least one second segment is modified to match the first resolution quality.

4. The system according to claim 3, the instructions further causing the processor to receive the initial media file from a second media source over a network, prior to reading the initial media file.

5. The system according to claim 4, wherein the second media source comprises a media source which employs a media streaming protocol.

6. The system according to claim 4, wherein the second media source comprises a media source which employs a file download protocol.

7. The system according to claim 4, wherein the second media source is the same as the first media source.

8. The system according to claim 3, wherein the first media source is a single media source.

9. The system according to claim 3, wherein the first media source comprises at least two media sources.

10. The system according to claim 3, the instructions further causing the processor to obtain the at least one segment having the first resolution quality simultaneously with reading the initial media file.

11. The system according to claim 3, the instructions further causing the processor to obtain the at least one segment having the first resolution quality subsequent to completion of the reading of the initial media file.

12. The system according to claim 1, the instructions further causing the processor to employ an index file containing data about the initial media file.

13. The system according to claim 12, wherein the index file is employed in modifying the initial media file.

14. The system according to claim 12, wherein the index file contains data about resolution quality of segments of the initial media file.

15. The system according to claim 1, wherein the first resolution quality is a higher resolution quality than the second resolution quality.

16. The system according to claim 1, wherein the second media file is a first modified media file and the instructions further causing the processor to modify the initial media file to create a third media file wherein, in the third media file:
the first segment is modified to match the second resolution quality; and
the at least one second segment retains the second resolution quality.

17. The system according to claim 16, the instructions further causing the processor to modify the initial media file to create the third media file via changing the first segment in the initial media file to match the second resolution quality.

18. The system according to claim 16, the instructions further causing the processor to obtain, from a first media source, at least one file segment having the second resolution quality and modify the initial media file to create the third media file with the at least one obtained file segment having the first resolution quality such that:
the first segment is modified to match the second resolution quality; and the at least one second segment retains the second resolution quality.

19. The system according to claim 18, the instructions further causing the processor to enable the media device to determine a resolution quality level employed in generating the third media file.

20. The system according to claim 18, wherein a resolution quality level employed in generating the third media file is determined by the first media source.

21. The system according to claim 18, the instructions further causing the processor to store the third media file on the media device.

22. The system according to claim 18, the instructions further causing the processor to deliver media files after modification, via adaptive streaming, to a second media device.

23. The system according to claim 18, the instructions further causing the processor to create the third media file to impart all resolution quality levels to all segments.

24. A method comprising:
reading a multi-resolution copy of an initial media file adaptively streamed and comprising file segments each having a resolution quality, the segments comprising a first segment having a first resolution quality and at least a second segment having a second resolution quality, the second resolution quality being different from the first resolution quality;
employing resolution quality information of the file segments to:
modify the initial media file such that:
the first segment retains the first resolution quality; and
the at least one second segment is replaced to match the first resolution quality; and
storing a modified version of the initial media file as a second media file comprising segments all having the first resolution quality.

25. The method according to claim 24, wherein said modifying comprises modifying the initial media file via changing the at least one second segment in the initial media file to match the first resolution quality.

26. The method according to claim 24, further comprising:
obtaining, from a first media source, at least one file segment having the first resolution quality;
said modifying comprising modifying the initial media file with the at least one obtained file segment having the first resolution quality such that:
the first segment retains the first resolution quality; and
the at least one second segment is modified to match the first resolution quality.

27. The method according to claim 26, further comprising receiving the initial media file from a second media source over a network, prior to reading the initial media file.

28. The method according to claim 24, further comprising employing an index file in obtaining the at least one file segment, the index file containing data about the at least one file segment.

29. The method according to claim 24, wherein the second media file is a first modified media file and said modifying further comprises modifying the initial media file to create a third media file wherein, in the third media file:
the first segment is modified to match the second resolution quality; and
the at least one second segment retains the second resolution quality.

30. The method according to claim 29, further comprising delivering the third media file, via adaptive streaming, to a media device.

31. A computer program product comprising:
a computer readable storage device having computer readable program code embodied therewith, the computer readable program code comprising:
computer program code configured to read a multi-resolution copy of an adaptively streamed media file comprising file segments each having a resolution quality, the segments comprising a first segment having a first resolution quality and at least a second segment having a second resolution quality, the second resolution quality being different from the first resolution quality;
computer program code configured to employ resolution quality information of the file segments to:
obtain at least one replacement segment for the initial media file; and
modify the initial media file such that:
the first segment retains the first resolution quality; and
the at least one second segment is replaced to match the first resolution quality; and
computer program code configured to store a modified version of the initial media file as a second media file comprising segments all having the first resolution quality.

32. A system comprising:
a media device having one or more processors and instructions executable by the one or more processors, the instructions causing the processor to:
read a multi-resolution copy of an initial media file adaptively streamed and comprising file segments each having a resolution quality, the segments comprising a first segment having a first resolution quality and at least a second segment having a second resolution quality; and
employ resolution quality information of the file segments to:
obtain at least one replacement segment for the initial media file; and
modify the initial media file such that:
the first segment is modified to match a third resolution quality, the third resolution quality being different from the first and second resolution qualities; and
the at least one second segment is modified to match the third resolution quality; and
the system further being configured to store a modified version of the initial media file as a second media file comprising segments all having the third resolution quality.

33. The system according to claim 32, wherein the third resolution quality is a higher quality than the first resolution quality and the second resolution quality.

34. The system according to claim 32, wherein the first resolution quality is the same as the second resolution quality.

* * * * *